United States Patent [19]

Bhattacharyya et al.

[11] Patent Number: 5,354,932

[45] Date of Patent: Oct. 11, 1994

[54] CATALYTIC HYDROCARBON CONVERSION USING THERMALLY ACTIVATED HYDROTALCITE-TYPE CLAYS

[75] Inventors: Alakananda Bhattacharyya, Wheaton; Mark P. Kaminsky, Winfield, both of Ill.

[73] Assignee: Amoco Corporation, Chicago, Ill.

[21] Appl. No.: 93,768

[22] Filed: Jul. 19, 1993

Related U.S. Application Data

[60] Continuation of Ser. No. 881,752, May 8, 1992, abandoned, which is a division of Ser. No. 745,902, Aug. 16, 1991, Pat. No. 5,246,899.

[51] Int. Cl.$^5$ ............................................. C07C 2/00
[52] U.S. Cl. ............................................ 585/400; 585/480; 585/943
[58] Field of Search ............... 585/400, 943, 480

[56] References Cited

U.S. PATENT DOCUMENTS 4,843,168  6/1989  Drezdzon et al. ............... 585/440
4,866,019  9/1989  van Broekhoven ............... 502/65
5,246,899  9/1993  Bhattacharyya ................. 502/84

Primary Examiner—Asok Pal
Attorney, Agent, or Firm—Thomas E. Nemo; Wallace L. Oliver

[57] ABSTRACT

A catalytic process for the conversion of hydrocarbons is described. Catalyst in this improved process is made by thermally activating a hydrotalcite-type clay of formula:

$$M^{2+}{}_{2x}M^{3+}{}_2(OH)_{4x+4}A^{n-}{}_{2/n}\cdot ZH_2O$$

where $M^{2+}$ is one or more metal ion selected from the group consisting of $Mg^{2+}$, $Zn^{2+}$, $Cu^{2+}$, $Ni^{2+}$, $Co^{2+}$, $Mn^{2+}$ and $Fe^{2+}$ and $M^{3+}$ is one or more metal ion selected from the group consisting of $Al^{3+}$, $Fe^{3+}$, $Co^{3+}$, $Mn^{3+}$ and $Cr^{3+}$, x runs between 1.5 and 5, A is one or more anions selected from the group consisting of $B(OH)_4^-$, $[B_3O_3(OH)_4]^-$, $V_2O_7^{4-}$, $V_4O_{12}^{4-}$, and $V_3O_9^{3-}$, n is 1, 3 or 4, and Z runs between 0 and about 4. These hydrotalcite-type clays have an X-ray diffraction d(001) value greater than about 7.7 Angstroms.

6 Claims, No Drawings

CATALYTIC HYDROCARBON CONVERSION USING THERMALLY ACTIVATED HYDROTALCITE-TYPE CLAYS

CROSS-REFERENCE TO RELATED APPLICATION

This is a continuation of Ser. No. 07/881,752, filed May 8, 1992 and now abandoned, is a divisional application of application Ser. No. 07/745,902, filed Aug. 16, 1991, now U.S. Pat. No. 5,246,899.

BACKGROUND OF THE INVENTION

This invention relates to anionic clay compositions having the hydrotalcite crystal structure and, more particularly, to anionic hydrotalcite clays which are essentially carbonate-free and contain a one or more pH-dependent anion such as a boron-containing anion or Group Vb or VIb metalate located interstitially between the positively charged layers of metal hydroxides, and a direct and simplified method of preparation of such anionic clays from their components.

Clay minerals are composed of infinite layers of metal or non-metal oxides and hydroxides stacked one on top of the other. In the case of the widely-found cationic clays, interlayer cations ($Na^+$, $Ca^{2+}$ etc.) charge neutralize the negatively charged oxide/hydroxide sheets. The far less common anionic clays have positively charged metal oxide/hydroxide layers with anions located interstitially. Many of these are based on double hydroxides of such main group metals as Mg and Al and transition metals such as Ni, Co, Cr, Zn, Fe etc. These clays have a structure similar to brucite [$Mg(OH)_2$] in which the divalent ions are octahedrally surrounded by hydroxyl groups with the resulting octahedra sharing edges to form infinite sheets. In these anionic clays some of the divalent ion is isomorphously replaced by a trivalent ion, say $Al^{3+}$. The $Mg^{2+}$, $Al^{3+}$, $OH^-$ layers are then positively charged necessitating charge balancing by insertion of anions between the layers. One such clay is hydrotalcite in which the carbonate ion is the interstitial anion. Rhombohedral hydrotalcite has the idealized unit cell formula $[Mg_6Al_2(OH)_{16}]CO_3 \cdot 4H_2O$. However, the ratio of Mg/Al in hydrotalcite can vary between 1.7 and 4 and various other divalent and trivalent ions may be substituted for the magnesium and aluminum. In addition, the anion, which is carbonate in hydrotalcite, can vary in both the naturally occurring and synthetic varieties being replaced by a variety of simple anions such as $NO_3^-$, $Cl^-$, $OH^-$, $SO_4^{2-}$ etc. in naturally occurring varieties and by more complicated pillaring organic, inorganic, and organic-inorganic ion combinations in synthetic varieties. Hydrotalcites containing the large pillaring anions are generally made by substituting a hydrotalcite containing a simple anion by the larger pillaring anion. Substitution techniques which have been used are ion exchange and acid treatment in the presence of the desired replacing anion. Through changes in the size of the pillar used to separate the sheets in the clay structure, the pore size of the clay may be tailored to a particular use.

Processes for making hydrotalcite clays have been the subject of a number of publications, See, for example, U.S. Pat. Nos. 4,539,306 and 4,539,195 which are directed to pharmaceutical uses for hydrotalcite. Miyata et al. in U.S. Pat. Nos. 3,796,792, 3,879,523, and 3,879,525 describe a large number of hydrotalcites with divalent anionic layer substitution and include hydrotalcites containing $B_4O_7^{2-}$ and the transition metal anions $CrO_4^{2-}$, $Cr_2O_7^{2-}$, $MoO_4^{2-}$ and $Mo_2O_7^{2-}$. Both compositions and preparative methods are described, and the compositions are said to be useful for catalytic purposes, absorbents, desiccants, and the like. Miyata et al. in Clay and Clay Minerals, 25, pp, 14–18 (1977) describe the preparation of MgAl hydrotalcites containing $SO_4^{2-}$ or $CrO_4^{2-}$ as the interleaving anion by (1) mixing a solution containing $MgCl_2$ and $Al_2(SO_4)_3$ with a solution of sodium hydroxide or (2) mixing a solution of $MgCl_2$ and $AlCl_3$ with a solution of sodium hydroxide and a solution of sodium chromate.

In U.S. Pat. Nos. 4,458,026 and 4,476,324 and Journal of Catalysis 94, 547–57 (1985), Reichle describes catalytic reactions including aldol condensations using synthetic hydrotalcites containing smaller anions and also large organic anions such as long chain, aliphatic, alpha-omega dicarboxylates. The materials are made by dropping the source of divalent and trivalent ions into a basic solution of the desired anion.

Miyata and Kumura in Chemistry Letters pp. 843–8 (1973) describe hydrotalcite clay materials containing $Zn^{2+}$ and $Al^{3+}$ with dicarboxylate anions and show that the interlayer spacing obtained using X-ray diffraction expands from 9.4 Angstroms to about 19 Angstroms as the dicarboxylate anion is changed along the series oxalate, malonate, succinate, adipate and sebacate. This study indicates the carboxylate anions are in the lattice standing roughly perpendicular to the layers.

Pinnavaia et al. in Synthetic Metals 34, 609–15 (1989) reports an EXAFS study of some $Zn_2Al$, $Zn_2Cr$ and $Ni_3Al$ hydrotalcites with pillaring anions such as $V_{10}O_{28}^{6-}$ made by exchanging the hydrotalcite chloride or nitrate with a salt of the transition element metalate. Similar materials using the $Mo_7O_{24}^{6-}$ and a series of Keggin-type ions such as $\alpha\text{-}[H_2W_{12}O_{40}]^{6-}$ were also made by exchange.

Recently, two U.S. Pat. Nos. 4,774,212 and 4,843,168 have appeared, describing hydrotalcites pillared with large organic, inorganic, and mixed organic-inorganic anions made by first preparing an organic anion-pillared hydrotalcite at one pH, and then substituting partially or fully the organic anion by a large transition element metalate at a different pH. The patents describe the use of such materials for the catalytic dehydrogenation of t-butylethylbenzene to t-butylstyrene as well as other catalyzed reactions.

The success of molecular sieves for catalytic purposes has prompted a search for other porous inorganic materials which could act as shape selective catalysts. Pillared cationic clays have been investigated as part of this search but the small number of useful large cations and the amount of open volume left after completely pillaring many of the materials has been a concern. Also, the poor thermal stability of several of the cationic pillars has been discouraging since the pillars collapse during higher temperature catalytic use. Cationic pillared clays are usually acidic.

Anionic clays, which are usually basic clays, have also been considered, as has been reviewed above, but the work reported has resulted in few examples of anionic clays with substantial catalytic potential, i.e., a clay with a large interlayer spacing having an incompletely stuffed gallery containing useful catalytic sites open to reaction. Also, because of pH limitations on the hydrotalcite preparation, not many examples of such materials have been made even with small non-pillaring anions, and those hydrotalcites made so far with large pillaring anions are few in number and made by a time consuming process.

Now a simplified and direct technique has been found to produce hydrotalcite-type clays with sizable interlayer spacings that are pillared by pH dependent, essentially carbonate-free, boron-containing anions and transition element metalates. The technique extends the number of large anions which can be incorporated in a hydrotalcite-type clay and also the range of metal ions which can be substituted for the divalent and trivalent metal ions of hydrotalcite. Such hydrotalcite-type clays can have more open galleries, contain catalytically active ions in the anionic layers, and catalyze a wide range of hydrocarbon conversion reactions.

SUMMARY OF THE INVENTION

The invention described herein is in one aspect a process for preparing a hydrotalcite-type clay comprising adding a solution containing one or more divalent metal ion selected from the group consisting of $Mg^{2+}$, $Zn^{2+}$, $Cu^{2+}$, $Ni^{2+}$, $Co^{2+}$, $Mn^{2+}$ and $Fe^{2+}$ and one or more trivalent metal ion selected from the group consisting of $Al^{3+}$, $Fe^{3+}$, $Co^{3+}$, $Mn^{3+}$, and $Cr^{3+}$ to an essentially carbonate-free solution, the pH of said solution selectively chosen between about 6 and 14, containing an intercalating agent to form a mixture, and thereafter recovering a material of formula $M^{2+}{}_{2x}M^{3+}{}_{2}(OH)_{4x+4} A^{n-}{}_{2n} \cdot ZH_2O$ from said mixture, wherein x runs between 1.5 and 5, n runs between 1 and 8, A is one or more anions selected from the group consisting of pH-dependent, essentially carbonate-free inorganic anions, and Z runs between 0 and about 4, said hydrotalcite-type clay having a x-ray diffraction d(001) value greater than about 7.7 Angstroms. In another aspect the invention is a hydrotalcite-type clay having the formula:

$$M^{2+}{}_{2x}M^{3+}{}_{2}(OH)_{4x+4}A^{n-}{}_{2/n} \cdot ZH_2O$$

wherein $M^{2+}$ is one or more metal ion selected from the group consisting of $Mg^{2+}$, $Zn^{2+}$, $Cu^{2+}$, $Ni^{2+}$, $Co^{2+}$, $Mn^{2+}$, and $Fe^{2+}$ and $M^{3+}$ is one or more metal ion selected from the group consisting of $Al^{3+}$, $Fe^{3+}$, $Co^{3+}$, $Mn^{3+}$ and $Cr^{3+}$, wherein x runs between 1.5 and 5, n is 1 or a number between 3 and 8, A is one or more anions selected from the group consisting of pH-dependent, essentially carbonate-free, inorganic anions, and Z runs between 0 and about 4, said hydrotalcite-type clay having a x-ray diffraction d(001) value greater than about 7.7 Angstroms.

DETAILED DESCRIPTION OF THE INVENTION

To make the hydrotalcite-type clays of this invention, one combines in solution under essentially carbon-dioxide-free conditions one or more divalent metal ion compound, preferably the nitrate, sulfate or chloride, of a metal selected from the group consisting of magnesium, zinc, copper, nickle, cobalt, manganese, and iron with one or more trivalent metal ion compound selected from the group consisting of aluminum, iron, cobalt, manganese, and chromium. More preferably, the one or more divalent metal compound is a compound of magnesium, zinc or nickle and the one or more trivalent metal compound is a compound of aluminum, iron, cobalt or chromium.

The solution of the divalent and trivalent metal compounds is added to an essentially carbonate-free solution containing an intercalating agent. By intercalating agent is meant a material which when dissolved in water or aqueous base, makes available (after proper pH adjustment) the desired one or more anion for formation of the hydrotalcite-type clay. For example, $H_3BO_3$ is an intercalating agent which can make available in solution the ions: $B(OH)_4{}^-$, $[B_3O_3(OH)_4]^-$, $[B_3O_3(OH)_5]^{2-}$, $[B_4O_5(OH)_4]^{2-}$, etc. depending upon the pH of the solution. $NaVO_3$ is an intercalating agent which can in solution the ions: $V_2O_7{}^{4-}$, $V_4O_{12}{}^{4-}$, $V_{10}O_{28}{}^{6-}$ etc. depending upon the pH of the solution. Intercalating agents for other transition element metalates and their pH-dependent behavior are known to those skilled in the art. Such information may be found in Kepert, D. L., "The Early Transition Metals", Academic Press, London (1972). In Table 1 below are shown the pH ranges over which several anions which can be used in this invention are present in substantial amount and stable.

TABLE 1

| Useful pH Range of Several Anions | |
|---|---|
| Anion | pH Range |
| $B(OH)_4{}^-$ | >10.5 |
| $[B_3O_3(OH)_4]^-$ | 7.5–9.5 |
| $[B_3O_3(OH)_5]^{2-}$ | 8.5–10 |
| $[B_4O_5(OH)_4]^{2-}$ | 8.5–9.5 |
| $V_4O_{12}{}^{4-}$ | 6.5–8 |
| $HV_2O_7{}^{3-}$ | 8–10 |
| $V_2O_7{}^{4-}$ | 10–13 |
| $V_3O_9{}^{3-}$ | 6.5–8 |
| $V_{10}O_{28}{}^{6-}$ | 6–7 |

The pH of the solution to which the divalent and trivalent ion solution is added is adjusted with acid or base to shift the equilibria of the pH-dependent, intercalating agent so that the anionic species desired to prepare the hydrotalcite is present in the solution. This pH adjustment, in order to keep the pH within the range in which the hydrotalcite-type clays are formed, must be held in the range from about 6 to 14.

Table 2 below shows the approximate pH ranges in which hydrotalcite-type clays containing various divalent and trivalent metal ion combinations are formed.

TABLE 2

Approximate pH Ranges Required to Prepare Hydrotalcite-Type Clays with Different Combinations of Divalent and Trivalent Metal Ions

| Divalent Metal Ion | Trivalent Metal Ion | Approximate pH Range |
|---|---|---|
| $Mg^{2+}$ | $Al^{3+}, Fe^{3+}, Cr^{3+}, Bi^{3+}, Mn^{3+}, Co^{3+}$ | 8 to 12–14 |
| $Cu^{2+}$ | $Al^{3+}, Fe^{3+}, Cr^{3+}, Bi^{3+}, Mn^{3+}, Co^{3+}$ | 6 to 12–13 |
| $Co^{2+}$ | $Al^{3+}, Fe^{3+}, Cr^{3+}, Bi^{3+}, Mn^{3+}, Co^{3+}$ | 8 to 12–13 |
| $Zn^{2+}$ | $Al^{3+}, Fe^{3+}, Cr^{3+}, Bi^{3+}, Mn^{3+}, Co^{3+}$ | 7 to 10–11 |
| $Ni^{2+}$ | $Al^{3+}, Fe^{3+}, Cr^{3+}, Bi^{3+}, Mn^{3+}, Co^{3+}$ | 6 to 12–13 |
| $Mn^{2+}$ | $Al^{3+}, Fe^{3+}, Cr^{3+}, Bi^{3+}, Mn^{3+}, Co^{3+}$ | 9 to 12–13 |
| $Fe^{2+}$ | $Al^{3+}, Fe^{3+}, Cr^{3+}, Bi^{3+}, Mn^{3+}, Co^{3+}$ | 7 to 12–14 |

For example, a magnesium salt and an aluminum salt are combined in water and added to an essentially carbonate-free, boron-containing solution ($H_3BO_3$). The approximate pH range to produce the hydrotalcite-type clay is 8 to 14. To maximize the amount of boron-containing anion $B(OH)_4{}^-$ available 10 for incorporation into the clay, the pH of the intercalating agent solution must be 10.5 or higher. To instead incorporate $[B_3O_3(OH)_4]^-$ pillars in a hydrotalcite-type clay of magnesium and aluminum, the pH range of optimum formation of the anion is 7.5 to 9.5 which is within the hydrotalcite-formation range of 8 to 14. See Table I and Table 2.

The pH dependent, essentially carbonate-free inorganic anion may be a pH-dependent, essentially carbonate-free, boron-containing anion, Period Group Vb metalate, or Periodic Group VIb metalate. Preferably it is pH-dependent, essentially carbonate-free, boron-containing anion or metalate of vanadium, niobium, tantalum, molybdenum or tungsten. More preferably, it is $B(OH)_4^-$, $[B_3O_3(OH)_4]^-$, $[B_3O_3(OH)_5]^{2-}$, $[B_4O_5(OH)_4]^{2-}$, $V_2O_7^{4-}$, $HV_2O_7^{3-}$, $V_4O_{12}^{4-}$, $V_3O_9^{3-}$ or $V_{10}O_{28}^{6-}$. Most preferably, it is $[B_3O_3(OH)_4]^-$, $V_2O_7^{4-}$ or $V_4O_{12}^{4-}$. Pillaring anions useful in this invention also include $Nb_6O_{19}^{8-}$, $HNb_6O_{19}^{7-}$, $H_2Nb_6O_{19}^{6-}$, $NbO_4^{3-}$, $Ta_6O_{19}^{8-}$, $HTa_6O_{19}^{7-}$, $TaO_4^{3-}$, $Mo_7O_{24}^{6-}$, $HW_6O_{21}^{5-}$, and Keggin-type ions such as $PW_{11}O_{39}^{7-}$ and $SiW_{11}O_{39}^{7-}$ which are stable at a pH above about 6.

If the intercalating agent solution requires a base for pH adjustment, it is preferably ammonium hydroxides, an alkali metal hydroxide such as sodium hydroxide or a tetraalkylammonium hydroxide. If an acid is required to adjust the pH, a mineral acid such as nitric or hydrochloric acid can be used. This pH adjustment is required in order for the hydrotalcite to form and precipitate. The formation solution generally requires heating for a period of time, preferably in the temperature range from about 40° to about 90° C., to hasten formation of the hydrotalcite-type clay.

The molar ratio of divalent to trivalent metal compound which is preferred is about 1.5 to about 5. The mols of intercalating agent used per mol of divalent and trivalent compounds used depends upon the charge on the anion to be incorporated, recognizing that each trivalent ion incorporated in the structure requires an extra negative charge in the interstitial layer. Generally, an excess of the anionic species is added to ensure complete reaction.

The divalent and trivalent metal ion compounds are optimally mixed together and added slowly with stirring to a warmed solution of the intercalating agent. The intercalating agent solution should have a pH within the range of about 6 to 14 dependent on the anion to be incorporated. Slower addition and a more elevated temperature (an autoclave may be used) tends to produce larger crystals as may be understood by one skilled in the art. Because the carbonate ion is strongly preferred as the interlayer ion, unavoidable exposure during preparation of the clay to carbon dioxide or carbonate ion may produce 0–2 wt. % of carbon in the essentially carbonate-free hydrotalcite-type clays of this invention.

In general, the anionic pillared clays produced by the invention have the idealized formula $M^{2+}_{2x}M^{3+}_2(OH)_{4x+4}A^{n-}_{2/n} \cdot ZH_2O$ where A is a simple anion like $B(OH)_4^-$ or a pillaring anion such as $[B_3O_3(OH)_4]^-$ or $(V_4O_{12})^{4-}$. They are generally white to colored, microcrystalline solids. In the formula, the value of X runs between 1.5 and 5, and more preferably between 1.75 and 4. The value of n is 1 or runs between 3 and 8, and more preferably, is 1 or runs between 3 and 6.

The surface areas of the hydrotalcite-type material of this invention are generally in the range of about 10 to about 50 m$^2$/g as measured by the BET technique.

Some representative X-ray diffraction data given in Table 3 below indicates that at least the $[B_3O_3(OH)_4]^-$ anion is incorporated into the lattice of the hydrotalcite-type clays in a more or less upright and extended position.

TABLE 3

| Compound | Approximate Anion Size[1] (Å) | d(00k) Spacing Expected[2] (Å) | d(00k) Spacing Observed[3,4,5] (Å) |
|---|---|---|---|
| $Mg_4Al_2(OH)_{12}[B_3O_3(OH)_4]_2$ | 7.1 × 6.1 × (2.5 to 4.9) | 11.9 or 10.7 or <9.7 | 10.9 |
| $Mg_{4-x}Zn_xAl_2(OH)_{12}[B_3O_3(OH)_4]_2$ (X = 1–3) | 7.1 × 6.1 × (2.5 to 4.9) | 11.9 or 10.7 or <9.7 | 10.9 |
| $Zn_4Al_2(OH)_{12}[B_3O_3(OH)_4]_2$ | 7.1 × 6.1 × (2.5 to 4.9) | 11.9 or 10.7 or <9.7 | 10.9 |
| $Mg_{4-x}Zn_xAl_2(OH)_{12}B(OH)_4$ (x = 0–4) | 4.11 × 4.8 | 8.9 or 9.6 | 8.0 |
| $Mg_8Al_4(OH)_{24}(V_2O_7)$ | 7.8 × 5.0 | 12.6 or 9.8 | 10.5 |
| $Mg_6Al_3(OH)_{18}(HV_2O_7)$ | 7.8 × 5.0 | 12.6 or 9.8 | * |
| $Mg_8Al_4(OH)_{24}(V_4O_{12})$ | 7.5 × 7.5 × 5.5 | 12.3 or 10.3 | 9.7 |
| $Mg_{12}Al_6(OH)_{36}(V_{10}O_{28})$ | 7.1 × 8.1 × 10.3 | 11.9 or 12.9 or 15.2 | 11.9 |

[1] Two or three dimensions are given depending upon anion shape.
[2] Expected d(00k) spacing equals anion size plus brucite layer thickness (4.80A).
[3] Most values are d(001) spacings and all represent that derived from the lowest angle reflection.
[4] From powder XRD using Cu Kα radiation.
[5] The observed values can vary somewhat depending upon degree of hydration.
*Not measured.

The anionic hydrotalcite-type clays of this invention are found to be useful for such diverse purposes as desiccants, absorbents and, after thermal activation, as basic catalysts with varying basicity due to the ability not only to change the interleaving anion but also change the type of divalent and trivalent metal ion employed. They can be used for hydrocarbon conversions in vapor phase, or liquid phase heterogeneous catalysis as the clays effectively catalyze the dehydrogenation, oxidation, isomerization and ammoxidation of hydrocarbons.

To thermally activate the hydrotalcite-type clays, they are calcined to about 500° C. to drive off essentially all their water of hydration and constitution producing materials having a surface area greater than about 50 m$^2$/g. At this stage the calcined product can generally be returned to the hydrotalcite structure by rehydration. However, it is not necessary to calcine only to this temperature as further and higher temperature calcination decreases the surface area but does not generally effect the catalytically properties. The higher temperature calcinating products which can be either crystalline or amorphous are largely mixtures of binary and ternary oxides.

The dehydrogenation reaction can be either thermal or oxidative. For example, such materials as a lower alkyl ethylbenzene or propylbenzene may be dehydrogenated to a substituted styrene or cymene. And a xylene may be selectively converted to a dicyanobenzene by atomoxidation using oxygen and ammonia. In addition, aromatics like xylene can be isomerized over the products of this invention. Also, they can be used to catalyze the conversion of methane to higher hydrocarbons with or without oxygen.

In carrying out such hydrocarbon conversions using these anionic hydrotalcite-type clays, the process temperature generally runs between about 80° and about 900° C., more preferably, between about 100° and about 850° C. Total pressures useful in the catalyzed process can be anywhere between about 0.1 arm and several hundred arm, but a total pressure of about 1 to about 300 arm is preferred. Weight-hourly space velocities useful in these processes are in the range of about 0.1 to about 20 $hr^{-1}$, more preferably, about 0.5 to about 5 $hr^{-1}$. For methane oxidative coupling, space velocities are much higher as can be understood by one skilled in the art. If oxygen is used in the catalyzed dehydrogenation or oxidation, the oxygen-hydrocarbon feed molar ratios can be varied over a substantial range as can be understood by one skilled in the art. Such hydrocarbons as $C_1$ to $C_{10}$ aliphatic hydrocarbons and $C_1$ to $C_5$ lower alkyl substituted aromatics can be employed.

The pillared clays of this invention can be used either supported by an inorganic support such as silica, alumina, silica-alumina, etc., or unsupported. Preferably, they are used unsupported. Catalyst particle size will depend upon whether or not the pillared clay is supported and the type of reactor, e.g. a fixed bed or ebullated bed reactor, employed.

The following Examples will serve to illustrate certain embodiments of the herein disclosed invention. These Examples should not, however, be construed as limiting the scope of the novel invention as there are many variations which may be made thereon without departing from the spirit of the disclosed invention, as those of skill in the art will recognize.

EXAMPLES

General

Analytical data (Na, Mg, Al, etc.) was obtained either by the atomic absorption or inductively coupled plasma technique. Carbonate analysis was done volumetrically by $CO_2$ evolution and C and H by a high accuracy, C, H analysis. Powder XRD was used to check crystallinity and determine the d(001) spacing (layer spacing). Where crystallinity was insufficient or interlayer spacing too large to determine the d(001) spacing accurately, it was determined by preferred orientation XRD, PO-XRD. Surface areas were measured using nitrogen by the BET procedure. Scanning electron microscopy (SEM) was used to determine the homogeneity of certain pillared products.

In the methane conversion Example 18, methane and oxygen were cofed into a 15 mm I.D. quartz plug flow mode microreactor with a 3 ml catalyst bed at 1 atm. The composition of the feed which came from a pre-blended tank was 30% $CH_4$, 6% $O_2$, and 64% $N_2$. The product gases were passed through a water cooled condenser before sampled by an on-line gas chromatograph. The reaction temperature was 850° C. which was controlled by a three-zone electric furnace with three thermocouples centered in the top, middle and bottom of the catalyst bed.

COMPARATIVE EXAMPLE 1

A 500 mL, 3-neck round bottom flask equipped with a thermometer, reflux condenser, and mechanical stirrer was charged with 200 mL dionized water, 10.6 g of $Na_2CO_3$, and 28.0 g of NaOH pellets. A second solution containing 51.3 g $Mg(NO_3)_2.6H_2O$, 37.5 g $Al(NO_3)_3.9H_2O$, and 160 mL of deionized water was prepared and added dropwise to the first solution while stirring for a period of about 1 h. After addition was complete the gelatinous mixture was heated for about 15 h at 75°–85° C. The cooled mixture was then filtered, washed repeatedly with water, and dried overnight under vacuum at 115° C. The Mg/Al ratio of this product was 1.82. The carbonate content was 11.34 wt % corresponding to a $CO_3^{2-}/Al^{3+}$ molar ratio of 0.44. The XRD pattern was indexed to hydrotalcite and the d(003) spacing found to be 7.64 Angstroms. The product has the approximate formula $Mg_4Al_2(OH)_{12}CO_3.4H_2O$.

COMPARATIVE EXAMPLE 2

A 500 mL, 3-neck round bottom flask equipped with a thermometer, reflux condenser, and mechanical stirrer was charged with 210 mL deionized water, 10.6 g of $Na_2CO_3$, and 34.6 g of NaOH pellets. A second solution containing 76.9 g $Mg(NO_3)_2.6H_2O$, 37.5 g $Al(NO_3)_3.9H_2O$, and 200 mL of deionized water was prepared and added dropwise to the first solution while stirring for a period of about 1 h. After addition was complete the gelatinous mixture was heated for about 15 h at 75°–85° C. The cooled mixture was then filtered, washed repeatedly with water, and dried overnight under vacuum at 115° C. The Mg/Al ratio of this product was 3.0. The carbonate content was 9.94 wt % corresponding to a $CO_3^{2-}/A^{3+}$ molar ratio of 0.54. The XRD pattern was indexed to hydrotalcite and the d(001) spacing found to be 7.64 Angstroms. The product has the approximate formula $Mg_6Al_2(OH)_{16}CO_3.4H_2O$.

COMPARATIVE EXAMPLE 3

A 500 mL, 3-neck round bottom flask equipped with a thermometer, reflux condenser, and mechanical stirrer was charged with 200 mL deionized water, 3.98 g of $Na_2CO_3$, and 10.51 g of NaOH pellets. A second solution containing 19.61 g $Zn(NO_3)_2.6H_2O$, 14.1 g $Al(NO_3)_3.9H_2O$, and 160 mL of deionized water was prepared and added dropwise to the first solution while stirring for a period of about 1 h. After addition was complete the gelatinous mixture (pH=10) was heated for about 15 h at 75°–85° C. The cooled mixture was then filtered, washed repeatedly with water, and dried overnight under vacuum at 115° C. The Zn/Al ratio of this product was 1.82. The carbonate content was 8.89 wt % corresponding to a $CO_3^{2-}/Al^{3+}$ molar ratio of 0.42. The XRD pattern was indexed to hydrotalcite and the d(001) spacing found to be 7.8 Angstroms. The product has the formula $Zn_4Al_2(OH)_{12}CO_3.4H_2O$.

EXAMPLE 4

A 500 mL, 3-neck round bottom flask equipped with a thermometer, reflux condenser, and mechanical stirrer was charged with 200 mL degassed, deionized water, 20.868 g (0.3375 mol) of $H_3BO_3$, and 25.54g (0.6375 mol) of NaOH pellets. A second solution containing 38.46g of $Mg(NO_3)_2.6H_2O$ (0.15 mole) and 28.13 g (0.075 mol) $Al(NO_3)_3.9H_2O$), and 200 mL of water was prepared and added dropwise to the first solution while stirring for a period of about 1 h. After addition was complete, the gelatinous mixture (pH about 9) was heated for about 15 h at 75°–80° C. The cooled mixture was then filtered, washed repeatedly with water, and dried overnight under vacuum at 70° C. The product has the approximate formula $Mg_4Al_2(OH)_{12}[B_3O_3(OH)_4]_2 \cdot H_2O$. The Mg/Al molar ratio of the product was 1.90. The boron content was 9.91 wt. % corresponding to a $[B_3O_3(OH)_4]^-/Al^{3+}$ molar ratio of 2.8. The d(001) spacing by powder XRD was about 10.9 Angstroms.

EXAMPLE 5

A 1 L, 3-neck round bottom flask equipped with a thermometer, reflux condenser, and mechanical stirrer was charged with 200 mL deionized water, 20.868g of $H_3BO_3$, and 25.544 g of NaOH pellets. A second solution containing 38.46 g $Mg(NO_3)_2 \cdot 6H_2O$ and 28.13 g $Al(NO_3)_3 \cdot 9H_2O$, and 200 mL of water was prepared and added dropwise to the first solution while stirring for a period of about 1 h. After addition was complete, the gelatinous mixture (pH about 8.5) was heated for about 15 h at 75°–80° C. The cooled mixture was then filtered, washed repeatedly with water, and dried overnight under vacuum at 70° C. The product has the approximate formula $Zn_4Al_2(OH)_{12}[B_3O_3(OH)_4]_2 \cdot H_2O$. The $Mg^{2+}/Al^{3+}$ molar ratio was found to be 1.90. The boron content was 6.61 wt. % corresponding to a $[B_3O_3(OH)_4]^-/Al^{3+}$ molar ratio of 2.53. The d(001) spacing by XRD was about 10.9 Angstroms.

EXAMPLES 6, 7, AND 8

A solution of 0.15 mols of $(Mg+Zn)NO_3$, 0.075 mols of $Al(NO_3)_3$ (28.13 g) and 400 mL of deionized, degassed water was added over one hour to a stirred solution of 0.6375 mole of NaOH (25.54 g), 0.3375 mole of $H_3BO_3$ (20.87 g) and 400 mL of deionized, degassed water. The rest of the preparation procedure is same as the other examples. The products have the formulas $Zn_{4-x}Mg_xAl_2(OH)_{12}[B_3O_3(OH)_4]_2 \cdot H_2O$ where x runs between 1 and 3. The $Mg^{2+}/Al^{3+}$ molar ratios of the products are in the range 1.7 to 1.9. The $[B_3O_3(OH)_4]^-/Al^{3+}$ molar ratio was determined as approximately 2.5. Powder XRD gives a value of 10.9 Angstroms for the d(001) spacing.

EXAMPLE 9

A 500 mL, 3-neck round bottom flask equipped with a thermometer, reflux condenser, and mechanical stirrer was charged with 200 mL deionized water, 10.0 g of $H_3BO_3$, and 32.0 g of NaOH pellets. A second solution containing 51.3 g $Mg(NO_3)_2 \cdot 6H_2O$, 37.5 g $Al(NO_3)_3 \cdot 9H_2O$, and 160 mL of deionized water was prepared and added dropwise to the first solution while stirring under nitrogen for a period of about 1 h. After addition was complete the gelatinous mixture (pH about 11) was heated for about 15 h at 80°–85° C. The cooled mixture was then filtered in air, washed repeatedly with water, and dried overnight under vacuum at 115° C. The Mg/Al ratio of this product was 1.93. The $B(OH)_4^-$ and carbonate content of this material was found to be 18.81 wt % and 3.9 wt. %, respectively. The product has the approximate formula $Mg_4Al_2(OH)_{12}[B(OH)_4]_2 \cdot H_2O$. The d(001) value was determined as 8.0 Angstroms.

EXAMPLES 10, 11, 12 AND 13

A solution of 0.15 mols of $(Mg+Zn)NO_3$, 0.075 mols of $Al(NO_3)_3$ (28.13 g) and 400 mL of deionized, degassed water was added over one hour to a stirred solution of 0.6375 mol of NaOH (25.54 g), 0.15 mole of $H_3BO_3$ (9.27 g) and 400 mL of deionized, degassed water. The rest of the preparation procedure is same as the other Examples. The products have the formula $Zn_{4-x}Mg_xAl_2(OH)_{12}[B(OH)_4]_2 \cdot H_2O$ where x runs between 0 and 3. The d(001) value of each of the four products is about 8.0 Angstroms.

EXAMPLE 14

A 1 L, 3-neck round bottom flask equipped with a thermometer, reflux condenser, and mechanical stirrer was charged with 275 mL deionized water, 12.2 g of $NaVO_3$, and 28.048 g of NaOH pellets. A second solution containing 51.286 g $Mg(NO_3)_2 \cdot 6H_2O$ and 37.51 g $Al(NO_3)_3 \cdot 9H_2O$, and 200 mL of water was prepared and added dropwise to the first solution while stirring for a period of about 1 h. After addition was complete, the gelatinous mixture (pH=10.8) was heated for about 15 h at 80°–85° C. The cooled mixture was then filtered, washed repeatedly with water, and dried overnight under vacuum at 70° C. It shows a powder XRD pattern with d(001) value of 10.5 Angstroms. The elemental analysis calculated on the formula $Mg_8Al_4(OH)_{24}(V_2O_7) \cdot 4H_2O$ is Mg, 19.5; Al, 10.8, H, 3.2; V, 10.2. Observed, Mg, 18.3; Al, 8.0; H, 3.8; V, 9.9. Mol ratios are Mg/Al+2.54 and V/Al=0.66.

EXAMPLE 15

A 1 L, 3-neck round bottom flask equipped with a thermometer, reflux condenser, and mechanical stirrer was charged with 275 mL deionized water, 24.4 g of $NaVO_3$, and 24.04 g of NaOH pellets. A second solution containing 51.286 g $Mg(NO_3)_2 \cdot 6H_2O$ and 37.51 g $Al(NO_3)_3 \cdot 9H_2O$, and 200 mL of water was prepared and added dropwise to the first solution while stirring for a period of about 1 h. After addition was complete, the gelatinous mixture (pH=9.5) was heated for about 15 h at 80°–85° C. The cooled mixture was then filtered, washed repeatedly with water, and dried overnight under vacuum at 70° C. It shows a powder XRD pattern with d(001) value of 9.7 Angstroms. The elemental analysis calculated on the formula $Mg_8Al_4(OH)_{24}(V_4O_{10}) \cdot 4H_2O$ is as follows: Mg, 16.6; Al, 9.2, H, 2.7; V, 17.3. Observed, Mg, 18.7; Al, 7.8; H, 2.8; V, 17.8. Mol ratios are Mg/Al+2.66 and V/Al=1.2.

EXAMPLE 16

A 1 L, 3-neck round bottom flask equipped with a thermometer, reflux condenser, and mechanical stirrer was charge with 275 mL deionized water, 12.2 g of $NaVO_3$, and 24.4 g of NaOH pellets. A second solution containing 51.286 g $Mg(NO_3)_2 \cdot 6H_2O$ and 27/51 g $Al(NO_3)_3 \cdot 9H_2O$, and 200 mL of water was prepared and added dropwise to the first solution while stirring for a period of about 1 h. After addition was complete, the gelatinous mixture (pH=8.8) was heated for about 15 h at 80°–85° C. The cooled mixture was then filtered, washed repeatedly with water, and dried overnight under vacuum at 70° C. The product has the formula $Mg_6Al_3(OH)_{18}(HV_2O_7) \cdot ZH_2O$.

EXAMPLE 17

A number of zinc-magnesium-aluminum hydrotalcites made in earlier Examples were calcined by placing a weighed amount of the hydrotalcite in a calciner and raising the temperature at 20° C. per rain until a temperature of about 450° C. was reached. The material was kept at about 450° C. for about 15 hr and then sieved to 80–100 mesh for use in Example 18.

EXAMPLE 18

The thermally activated hydrotalcites as made by the procedure of Example 17 were tested for their ability to catalyze the oxidation of methane by the procedure outlined above. The results are shown in Table 4 below.

TABLE 4

| Hydrotalcite | Catalyst | Methane Oxidation[1] $O_2$ Conv | $C_{2+}$ Sel. | % $CH_4$ Conv. | GHSV $hr^{-1} \times 10^3$ | CO/$CO_2$ |
|---|---|---|---|---|---|---|
| $Zn_4Al_2(OH)_{12}CO_3 \cdot 4H_2O$ | $Zn_4Al_2O_7$ | 100 | 0.0 | 12.5 | 4.5 | * |
| $Zn_4Al_2(OH)_{12}CO_3 \cdot 4H_2O$ | $Zn_4Al_2O_7{}^3$ | 100 | 50 | 19.1 | 3.0 | * |
| $Zn_4Al_2(OH)_{12}CO_3 \cdot 4H_2O$ | $Zn_4Al_2O_7{}^3$ | 74 | 57.4 | 15.4 | 4.1 | * |
| $Zn_3MgAl_2(OH)_{12}CO_3 \cdot 4H_2O$ | $Zn_3MgAl_2O_7$ | 100 | 32 | 15.4 | 4.52 | * |
| $Zn_3MgAl_2(OH)_{12}CO_3 \cdot 4H_2O$ | $Zn_3MgAl_2O_7{}^3$ | 98 | 50 | 18.3 | 3.60 | * |
| $Zn_3MgAl_2(OH)_{12}CO_3 \cdot 4H_2O$ | $Zn_3MgAl_2O_7{}^3$ | 78 | 54 | 15.4 | 4.09 | * |
| $Zn_3Mg_2Al_2(OH)_{12}CO_3 \cdot 4H_2O$ | $Zn_2Mg_2Al_2O_7$ | 100 | 14 | 13.6 | 4.5 | * |
| $Zn_3Mg_2Al_2(OH)_{12}CO_3 \cdot 4H_2O$ | $Zn_2Mg_2Al_2O_7{}^3$ | 100 | 41.5 | 17.3 | 2.7 | * |
| $Zn_3Mg_2Al_2(OH)_{12}CO_3 \cdot 4H_2O$ | $Zn_2Mg_2Al_2O_7{}^3$ | 100 | 48.1 | 14.5 | 4.08 | * |
| $ZnMg_3Al_2(OH)_{12}CO_3 \cdot 4H_2O$ | $Zn_1Mg_3Al_2O_7$ | 100 | 38 | 16.4 | 4.49 | * |
| $ZnMg_3Al_2(OH)_{12}CO_3 \cdot 4H_2O$ | $Zn_1Mg_3Al_2O_7{}^3$ | 98 | 50 | 18.3 | 4.94 | * |
| $ZnMg_3Al_2(OH)_{12}CO_3 \cdot 4H_2O$ | $Zn_1Mg_3Al_2O_7{}^3$ | 68 | 54 | 13.5 | 4.07 | * |
| $Zn_6Al_2(OH)_{16}CO_3 \cdot 4H_2O$ | $Zn_6Al_2O_9{}^3$ | 87 | 55.9 | * | 33 | 0.2 |
| $Zn_4Al_2(OH)_{12}[B_3O_3(OH)_4]_2 \cdot 2H_2O$ | $Zn_4Al_2B_6$ | 60 | 42.1 | 14 | 7.53 | 14.5 |
| $Mg_4Al_2(OH)_{12}CO_3 \cdot 4H_2O$ | $Mg_4Al_2O_7{}^3$ | 90 | 40.9 | 17.3 | 11.6 | * |
| $Mg_2Al(OH)_6[B(OH)_4] \cdot H_2O$ | $Mg_2AlBO_5$ | 91 | 45.1 | * | * | 1.1 |
| $Mg_2Al(OH)_6[B(OH)_4] \cdot H_2O$ | $Mg_2AlBO_5$ | 96 | 39.2 | 17.8 | 1.2 | 1.3 |
| $Mg_4Al_2(OH)_{12}[B_3O_3(OH)_4]_2 \cdot 2H_2O$ | $Mg_4Al_2B_6O_{16}$ | 61 | 47.2 | 15.2 | 1.2 | 7.3 |
| Non-hydrotalicite | $Zn/OAl_2O_3$ | 99.4 | 55.7 | 20 | 48 | 0.1 |
| Non-hydrotalicite | ZnO | 82 | 45 | 14 | 4.0 | 0.2 |
| Non-hydrotalicite | MgO | 99 | 47.2 | 20 | 1.2 | 0.5 |
| Non-hydrotalicite | $MgO/Al_2O_3{}^3$ | 99 | 47.4 | 20 | 16 | 0.5 |

[1]All catalytic runs were made at 850° C. except for that using $Zn_4Al_2O_7$ where the temperature was between 700 and 850° C.
[2]GHSV is gas hourly space velocity.
[3]The catalyst was diluted 7 to 1 with alpha-alumina (surface area of 0.1 m$^2$/g) which had been sieved to 40–60 mesh. The catalyst was sieved to 80–100 mesh and physically mixed with the alumina.
*Not measured.

That which is claimed is:

1. A process for the conversion of a hydrocarbon comprising contacting said hydrocarbon under hydrocarbon conversion conditions with a catalyst made by thermally activating a hydrotalcite clay of formula:

$$M^{2+}{}_{2x}M^{3+}{}_2(OH)_{4x+4}A^{n-}{}_{2/n} \cdot ZH_2O$$

where $M^{2+}$ is one or more metal ion selected from the group consisting of $Mg^{2+}$, $Zn^{2+}Cu^{2+}$, $Ni^{2+}$, $Co^{2+}$, $Mn^{2+}$ and $Fe^{2+}$ and $M^{3+}$ is one or more metal ion selected from the group consisting of $Al^{3+}$, $Fe^{3+}$, $Co^{3+}$, $Mn^{3+}$ and $Cr^{3+}$, x runs between 1.5 and 5, A is one or more anions selected from the group consisting of $B(OH)_4{}^-$, $[B_3O_3(OH)_4]^-$, $V_2O_7{}^{4-}$, $V_4O_{12}{}^{4-}$, and $V_3O_9{}^{3-}$, n is 1, 3 or 4, and Z runs between 0 and about 4, said hydrotalcite clay having an X-ray diffraction d(001) value greater than about 7.7 Angstroms.

2. The process for the conversion of a hydrocarbon according to claim 1 wherein A is one or more anions selected from the group consisting of $B(OH)_4{}^-$, $[B_3O_3(OH)_4]^-$, $V_2O_7{}^{4-}$, and $V_4O_{12}{}^{4-}$.

3. A process for oxidation of a hydrocarbon comprising contacting said hydrocarbon under hydrocarbon conversion conditions with a catalyst made by thermally activating a hydrotalcite clay of formula:

$$M^{2+}{}_{2x}M^{3+}{}_2(OH)_{4x+4}A^{n-}{}_{2/n} \cdot ZH_2O$$

where $M^{2+}$ is one or more metal ion selected from the group consisting of $Mg^{2+}$, $Zn^{2+}$ and $Ni^{2+}$ and $M^{3+}$ is one or more metal ion selected from the group consisting of $Al^{3+}$, $Fe^{3+}$, $Co^{3+}$ and $Cr^{3+}$, x runs between 1.5 and 5, A is one or more essentially carbonate-free anions selected from the group consisting of $B(OH)_4{}^-$, $[B_3O_3(OH)_4]^-$, $V_2O_7{}^{4-}$, $V_4O_{12}{}^{4-}$, and $V_3O_9{}^{3-}$, n is 1, 3 or 4, and Z runs between 0 and about 4, said hydrotalcite clay having an X-ray diffraction d(001) value greater than about 7.7 Angstroms, and wherein the catalyst has a surface area greater than about 50 m$^2$/g.

4. A process for the oxidation of methane comprising contacting said methane and an oxygen-affording material under hydrocarbon conversion conditions with a catalyst made by thermally activating a hydrotalcite clay of formula:

$$M^{2+}{}_{2x}M^{3+}{}_2(OH)_{4x+4}A^{n-}{}_{2/n} \cdot ZH_2O$$

where $M^{2+}$ is one or more metal ion selected from the group consisting of $Mg^{2+}$, $Zn^{2+}Cu^{2+}$, $Ni^{2+}$, $Co^{2+}$, $Mn^{2+}$ and $Fe^{2+}$ and $M^{3+}$ is one or more metal ion selected from the group consisting of $Al^{3+}$, $Fe^{3+}$, $Co^{3+}$, $Mn^{3+}$ and $Cr^{3+}$, x runs between 1.5 and 5, A is one or more anions selected from the group consisting of $B(OH)_4{}^-$, $[B_3O_3(OH)_4]^-$, $V_2O_7{}^{4-}$, $V_4O_{12}{}^{4-}$, and $V_3O_9{}^{3-}$, n is 1, 3 or 4, and Z runs between 0 and about 4, said hydrotalcite clay having an X-ray diffraction d(001) value greater than about 7.7 Angstroms.

5. A process for the oxidation of methane according to claim 4 wherein $M^{2+}$ is one or more metal ion selected from the group consisting of $Mg^{2+}$, $Zn^{2+}$ and $Ni^{2+}$ and $M^{3+}$ is one or more metal ion selected from the group consisting of $Al^{3+}$, $Fe^{3+}$, $Co^{3+}$ and $Cr^{3+}$.

6. The process for the oxidation of methane according to claim 4 wherein A is one or more anions selected from the group consisting of $B(OH)_4{}^-$, $[B_3O_3(OH)_4]^-$, $V_2O_7{}^{4-}$, and $V_4O_{12}{}^{4-}$.

* * * * *

UNITED STATES PATENT AND TRADEMARK OFFICE
CERTIFICATE OF CORRECTION

PATENT NO. : 5,354,932
DATED : October 11, 1994
INVENTOR(S) : Alakananda Bhattacharyya, Mark P. Kaminsky It is certified that error appears in the above-indentified patent and that said Letters Patent is hereby corrected as shown below:

| Col. | Line | |
|------|------|---|
| 4 | 9 | "NaVO$_3$ is an intercalating agent which can in solution the ions:" should read --NaVO$_3$ is an intercalating agent which can make available in solution the ions:-- |
| 4 | 63 | "anion B(OH)$_4$- available 10 for incorporation" should read --anion B(OH)$_4$- availabe for incorporation-- |
| 7 | 16 | "0.1 arm and several hundred arm," should read --0.1 atm and several hundred atm,-- |
| 7 | 18 | "300 arm is preferred." should read --300 atm is preferred.-- |
| 10 | 32 | "Mg/Al+2.54" should read --Mg/Al=2.54-- |
| 10 | 52 | "Mg/Al+2.66" should read --Mg/Al=2.66-- |

UNITED STATES PATENT AND TRADEMARK OFFICE
CERTIFICATE OF CORRECTION

PATENT NO. : 5,354,932

DATED : October 11, 1994

INVENTOR(S) : Alakananda Bhattacharyya, Mark P. Kaminsky

It is certified that error appears in the above-indentified patent and that said Letters Patent is hereby corrected as shown below:

| Col. | Line | |
|---|---|---|
| 11 | 6 | "20°C. per rain" should read --20°C. per min-- |
| 11 | 37 | in Table 4, under the column "Hydrotalcite" $Mg_2Al(OH)_6[BOH_4].H_2O$ should read --$Mg_2Al(OH)_6[B(OH)_4].H_2O$-- |

Signed and Sealed this

Twenty-eight Day of February, 1995

Attest:

BRUCE LEHMAN

Attesting Officer    Commissioner of Patents and Trademarks